(12) United States Patent
Adams

(10) Patent No.: US 9,879,818 B2
(45) Date of Patent: Jan. 30, 2018

(54) BRACKET ASSEMBLIES AND METHODS OF ASSEMBLING

(71) Applicant: Hubbell Incorporated, Shelton, CT (US)

(72) Inventor: Jonathan Oral Adams, Columbia, MO (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/594,428

(22) Filed: Jan. 12, 2015

(65) Prior Publication Data

US 2016/0201843 A1 Jul. 14, 2016

(51) Int. Cl.
| | |
|---|---|
| A47G 1/00 | (2006.01) |
| F16M 13/02 | (2006.01) |
| F16B 2/12 | (2006.01) |
| H01C 1/014 | (2006.01) |
| H01C 7/12 | (2006.01) |

(52) U.S. Cl.
CPC ............... *F16M 13/02* (2013.01); *F16B 2/12* (2013.01); *H01C 1/014* (2013.01); *H01C 7/12* (2013.01)

(58) Field of Classification Search
USPC ....................................................... 248/316.6
See application file for complete search history.

(56) References Cited

U.S. PATENT DOCUMENTS

| | | | |
|---|---|---|---|
| 2,245,611 A | 6/1941 | Schultz | |
| 2,628,050 A | 2/1953 | Hardwick | |
| 2,886,277 A | 5/1959 | Boham | |
| 3,218,517 A | 11/1965 | Sankey | |
| 3,329,039 A | 7/1967 | Johnson | |
| 3,729,518 A | 4/1973 | Lepper | |
| 3,848,786 A | 11/1974 | Baxter | |
| 3,931,689 A | 1/1976 | Shine | |
| 4,542,363 A | 9/1985 | Kato et al. | |
| 4,616,797 A | 10/1986 | Cramer | |
| 5,651,622 A | 7/1997 | Kim | |

(Continued)

FOREIGN PATENT DOCUMENTS

EP 1741965 A1 1/2007

OTHER PUBLICATIONS

International Search Report from corresponding International Application No. PCT/US2016/012475 dated Apr. 29, 2016.

(Continued)

*Primary Examiner* — Monica Millner
(74) *Attorney, Agent, or Firm* — Ohlandt, Greeley, Ruggiero & Perle, L.L.P.

(57) ABSTRACT

A bracket assembly is provided that includes a first strap, a second strap, and a first fastener. The first strap has an openable aperture including a cutout operatively connected to a keyhole. The second strap has a first aperture positioned opposite the cutout. The first fastener has a head, a neck, and a shaft. The neck is receivable in the openable aperture of the first strap with the shaft received in the first aperture of the second strap. The first fastener and the openable aperture allow the shaft to pass vertically between the cutout and the keyhole, but prevent the neck from vertically passing through between the cutout and the keyhole. The first fastener and the openable aperture allow the head to pass axially through only the keyhole.

5 Claims, 11 Drawing Sheets

(56) References Cited

U.S. PATENT DOCUMENTS

| | | | |
|---|---|---|---|
| 5,718,403 A | 2/1998 | Ott | |
| 5,998,748 A | 12/1999 | Taylor | |
| 6,093,901 A * | 7/2000 | Taylor | H01H 31/006 200/17 R |
| 6,130,391 A | 10/2000 | Taylor | |
| 6,239,369 B1 | 5/2001 | Balfour | |
| 6,262,691 B1 | 7/2001 | Austin et al. | |
| 6,283,425 B1 | 9/2001 | Liljevik | |
| 7,113,145 B1 | 9/2006 | Noble | |
| 7,780,132 B1 | 8/2010 | Tomaric | |
| 7,918,425 B2 | 4/2011 | Rathbone et al. | |
| 2010/0025559 A1 | 2/2010 | Rathbone et al. | |
| 2011/0233353 A1 | 9/2011 | Palmer | |
| 2012/0056059 A1 * | 3/2012 | Delamater | F16M 11/105 248/299.1 |
| 2014/0021316 A1 | 1/2014 | Adams et al. | |
| 2016/0178115 A1 * | 6/2016 | Kho | F16M 11/00 248/219.4 |

OTHER PUBLICATIONS

Written Opinion from corresponding International Application No. PCT/US2016/012475 dated Apr. 29, 2016.

International Preliminary Report dated Jul. 27, 2017 in corresponding International PCT Application No. PCT/US2016/012475, 10 pages.

* cited by examiner

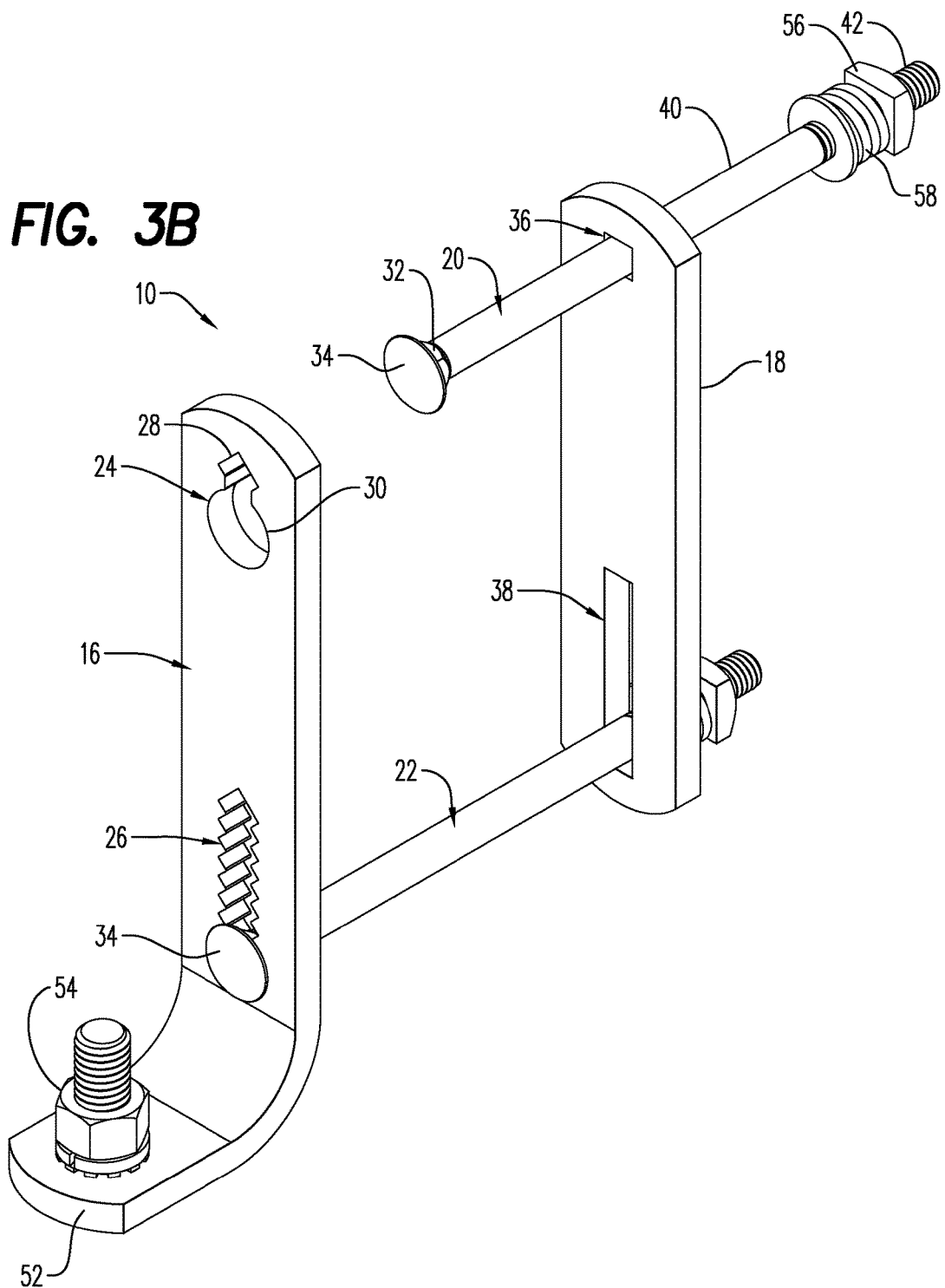

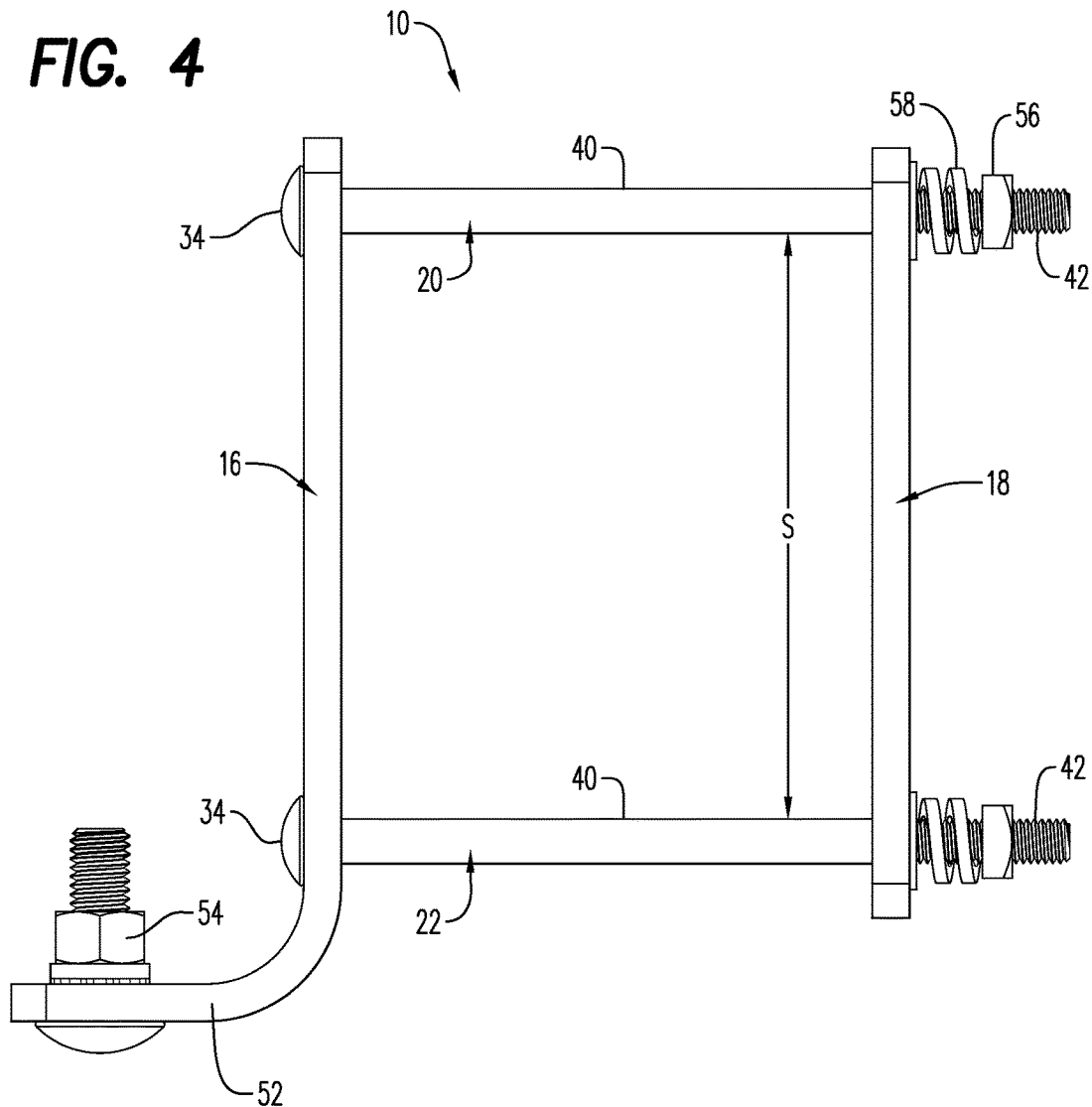

BRACKET ASSEMBLIES AND METHODS OF ASSEMBLING

BACKGROUND OF THE DISCLOSURE

1. Field of the Disclosure

The present disclosure is related to bracket assemblies and methods of assembling. More particularly, the present disclosure is related to bracket assemblies for securing an electrical device—such as a cutout arrester—to a support—such as a support of a utility pole.

2. Description of Related Art

Bracket assemblies are conventionally used for securing an electrical device to a support, such as a cutout arrester to a support of a utility pole. Lineman installing such bracket assemblies and electrical devices wear bulky gloves, which make assembling and manipulating the fasteners and nuts difficult.

Accordingly, it has been determined by the present disclosure that there is a need for bracket assemblies and methods for securing electrical devices to supports that overcome, alleviate, and/or mitigate one or more of the aforementioned and other deleterious effects of the prior art.

SUMMARY

A bracket assembly is provided that allows movement of the bracket assembly among a closed, pre-installation position, an open position, and an installed position without loosening any bolts with a separate tool.

In some embodiments, a bracket assembly is provided that includes a first strap, a second strap, and a first fastener. The first strap has an openable aperture including a cutout operatively connected to a keyhole. The second strap has a first aperture positioned opposite the cutout. The first fastener has a head, a neck, and a shaft. The neck is receivable in the openable aperture of the first strap with the shaft received in the first aperture of the second strap. The first fastener and the openable aperture allow the shaft to pass vertically between the cutout and the keyhole, but prevent the neck from vertically passing through between the cutout and the keyhole. The first fastener and the openable aperture allow the head to pass axially through only the keyhole.

In some embodiments alone or in combination with one or more of the aforementioned or aft mentioned embodiments, the openable aperture of the first strap and the first aperture of the second strap are closed in an upward direction, a downward direction, and both lateral directions.

In some embodiments alone or in combination with one or more of the aforementioned or aft mentioned embodiments, the assembly includes a passageway between the cutout and neck. The passageway allows the shaft to pass vertically through the passageway between the cutout and the keyhole.

In some embodiments alone or in combination with one or more of the aforementioned or aft mentioned embodiments, the cutout and neck have a square profile.

In some embodiments alone or in combination with one or more of the aforementioned or aft mentioned embodiments, the keyhole and the head have a circular profile.

In some embodiments alone or in combination with one or more of the aforementioned or aft mentioned embodiments, the openable aperture of the first strap is an upper aperture or a lower aperture.

In some embodiments alone or in combination with one or more of the aforementioned or aft mentioned embodiments, the openable aperture is above or below the keyhole.

In some embodiments alone or in combination with one or more of the aforementioned or aft mentioned embodiments, the first strap has an adjustable aperture and the second strap has a second aperture corresponding in position to the adjustable aperture.

In some embodiments alone or in combination with one or more of the aforementioned or aft mentioned embodiments, the assembly includes a second fastener that is received in the adjustable aperture of the first strap and the second aperture of the second strap.

In some embodiments alone or in combination with one or more of the aforementioned or aft mentioned embodiments, the adjustable aperture of the first strap comprises a plurality of nested cutouts. The second fastener and the adjustable aperture allow a shaft of the second fastener to vertically pass between the plurality of nested cutouts, but prevent a neck of the lower fastener from vertically passing between the plurality of nested cutouts.

In some embodiments alone or in combination with one or more of the aforementioned or aft mentioned embodiments, the first and second straps and the first and second fasteners are removably staked in a predetermined position with respect to one another to ensure the neck of the first fastener remains within the cutout and the neck of the second fastener remains within a respective one of the plurality of nested cutouts.

In some embodiments alone or in combination with one or more of the aforementioned or aft mentioned embodiments, the adjustable aperture of the first strap and the second aperture of the second strap are closed in an upward direction, a downward direction, and both lateral directions.

In some embodiments alone or in combination with one or more of the aforementioned or aft mentioned embodiments, the first strap and the first fastener are removably staked in a predetermined position with respect to one another to ensure the neck of the first fastener remains within the cutout.

A method of assembling a bracket assembly around a support is also provided. The method includes moving a first fastener and a first strap axially with respect to one another so that a neck of the first fastener is free of a cutout in the first strap; moving the first fastener in a first vertical direction so that the shaft passes through from the cutout into a keyhole; moving the first fastener and the first strap axially with respect to one another so that a head of the first fastener passes through the keyhole to form an opening; moving the support through the opening into a space between the first strap and a second strap; moving the first fastener and the first strap axially with respect to one another so that the head of the first fastener passes back through the keyhole with the shaft in the keyhole; moving the upper fastener in a second vertical direction, opposite the first vertical direction, so that the shaft passes from the keyhole into the cutout; and moving the first fastener and the first strap axially with respect to one another so that the neck of the first fastener is in the cutout in the first strap.

In some embodiments alone or in combination with one or more of the aforementioned or aft mentioned embodiments, the method also includes unstaking the first fastener and the first strap from one another before moving the first fastener and the first strap axially with respect to one another so that the neck of the first fastener is free of the cutout in the first strap.

In some embodiments alone or in combination with one or more of the aforementioned or aft mentioned embodiments, the method also includes moving a second fastener and the first strap axially with respect to one another so that a neck of the second fastener is free of a respective cutout of a plurality of nested cutouts in the first strap; moving the second fastener in the first or second vertical direction so that the shaft passes through the adjacent cutouts until the second fastener is proximate the support; and moving the second fastener and the first strap axially with respect to one another so that the neck of the lower fastener is in another respective cutout in the first strap.

In some embodiments alone or in combination with one or more of the aforementioned or aft mentioned embodiments, the method also includes unstaking the second fastener and the first strap from one another before moving the second fastener and the first strap axially with respect to one another so that the neck of the lower fastener is free of the respective cutout of the plurality of nested cutouts in the first strap.

In some embodiments alone or in combination with one or more of the aforementioned or aft mentioned embodiments, the first fastener is above the second fastener. Alternately, the second fastener is above the first fastener.

In some embodiments alone or in combination with one or more of the aforementioned or aft mentioned embodiments, the first vertical direction is upwards or downwards.

The above-described and other features and advantages of the present disclosure will be appreciated and understood by those skilled in the art from the following detailed description and drawings.

BRIEF DESCRIPTION OF THE DRAWINGS

FIG. 3b is a top perspective view of the bracket assembly of FIG. 1 in a fully opened state;

FIG. 4 is a side view of the bracket assembly of FIG. 1;

DETAILED DESCRIPTION

Figure 1:
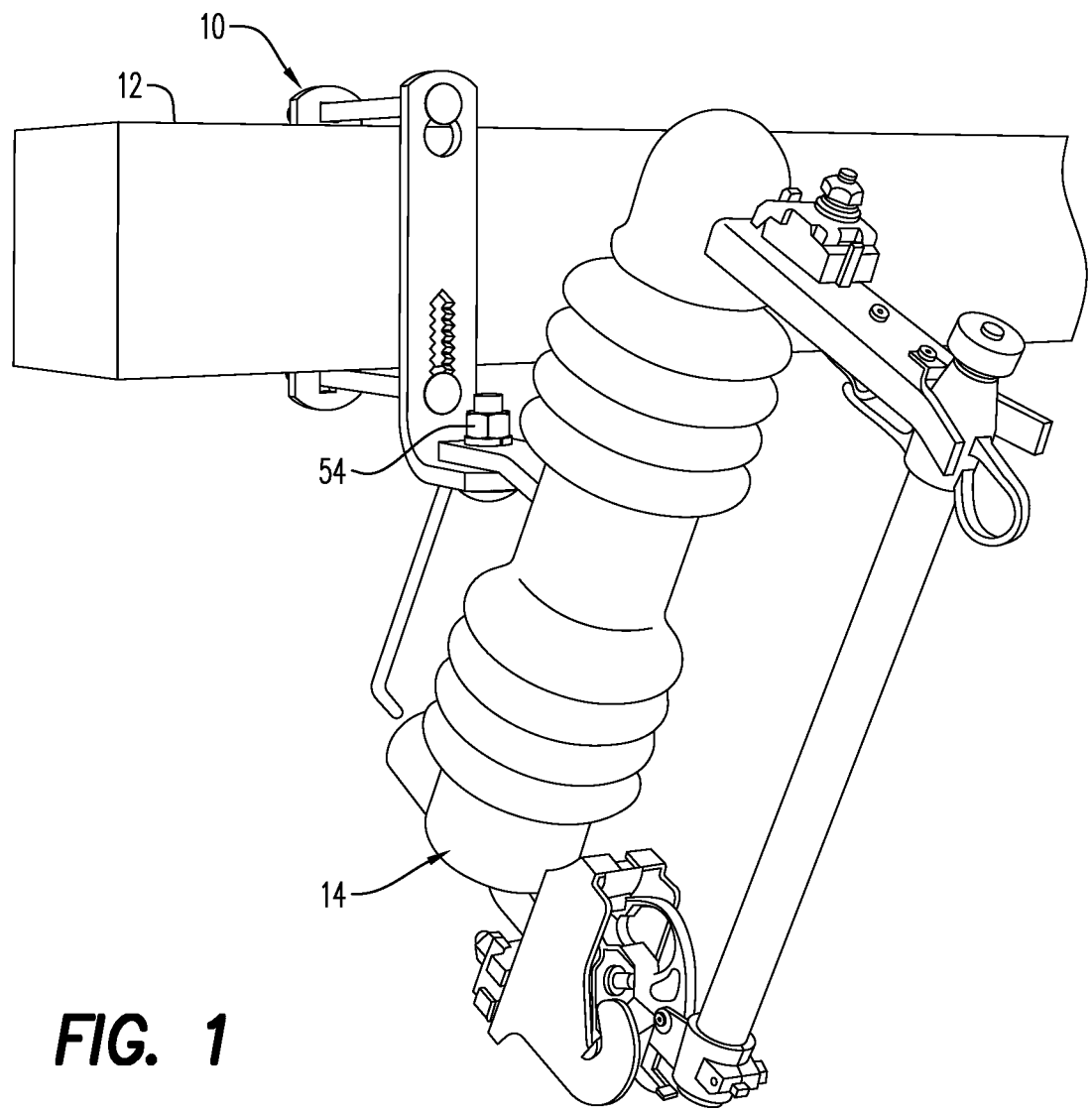
FIG. 1 is a top perspective view of an exemplary embodiment of a bracket assembly according to the present disclosure in use with an electrical device and attached to a support.

Referring to the drawings and in particular to FIG. 1, an exemplary embodiment of a bracket assembly according to the present disclosure is shown and is generally referred to by reference numeral 10. Here, bracket assembly 10 is shown in use securing an electrical device 12 such as but not limited to a cut out arrester to a support 14.

Advantageously, bracket assembly 10 is configured to secure electrical device 12 to support 14 in a manner that allows improves the ease of assembly and manipulation of any fasteners while wearing the necessary personal protection equipment.

Bracket assembly 10 is now described in more detail with simultaneous reference to FIGS. 2-10.

Bracket assembly 10 has a first strap 16, a second strap 18, an upper or first fastener 20, and a lower or second fastener 22. First strap 16 has an upper aperture 24 and a lower aperture 26. Upper aperture 24 includes a bolt neck cutout 28 adjacent to a keyhole 30. Cutout 28 can be shaped so that it generally conforms to a profile of a neck 32 of upper fastener 20. Cutout 28 can thus secure neck 32 in place, so that upper fastener 20 does not slip or fall downward when the lineman is installing bracket assembly 10. Keyhole 30 has a shape generally conforming to that of a head 34 of upper fastener 20, but is large enough for the head to pass therethrough.

When installed, bracket assembly 10 will be pulled down by gravity, thus applying a force in an upward direction ($U_d$) on upper fastener 20. This force can also help to keep neck 32 within cutout 28. Simply stated, it has been found that providing bracket assembly 10 with the ability to easily remove and install head 34 of upper fastener 20 through keyhole 30 of upper aperture 24, while keeping the upper fastener retainer within the bracket assembly increases the ease of use of the bracket assembly with respect to prior art assemblies.

Second strap 18 includes upper aperture 36 and lower aperture 38 that receive ends of upper fastener 20 and lower fastener 22, respectively. Upper aperture 36 is positioned opposite cutout 28 one another so that, when in the installed position of FIG. 1, upper fastener 20 passes between first and second straps 16, 18 at a location defined through upper aperture 36 and cutout 28 with the upper fastener normal or perpendicular to the straps.

Apertures 36, 38 of second strap 18—as well as apertures 24, 26 of first strap 16—are closed apertures. Specifically, apertures 24, 26, 36, 38 are closed in the upward direction ($U_d$), a downward direction ($D_d$), and both lateral directions ($L_d$). In this manner, fasteners 20, 22 cannot be removed from apertures 36, 38 of second strap 18 unless the nuts have been removed from the fasteners. Further, lower fastener 22 cannot be removed from lower aperture 26 of first strap 16 unless the nut has been removed from the fastener, while head 34 of upper fastener 20 can only be removed from upper aperture 24 of the first strap through keyhole 30 as described herein.

Thus, bracket assembly 10 is specifically configured to ensure that fasteners 20, 22 will not slip out or release from straps 16, 18 when in use, but allows the head end of first fastener 20 to be easily removed from first strap 16 to allow the bracket to be placed over support 12. Accordingly, bracket assembly 10 provides several features that assist a lineman or other worker installing the bracket assembly in challenging conditions and/or with bulky gloves.

Fasteners 20, 22, illustrated as carriage bolts, are described in more detail with reference to FIGS. 5a and 5b. Here, fasteners 20, 22 each include neck 32, head 34, a shaft 40, and a threaded end 42.

Cutout 28 has a shape that generally conforms to and is slightly larger than that of neck 32. Additionally, first strap 16 has a passageway 44 that connects cutout 28 and keyhole 30. Passageway 44 is large enough to allow shaft 40 to pass from cutout 28 to keyhole 30, but is small enough to prevent neck 32 to pass from the cutout to the keyhole.

Figure 3A:
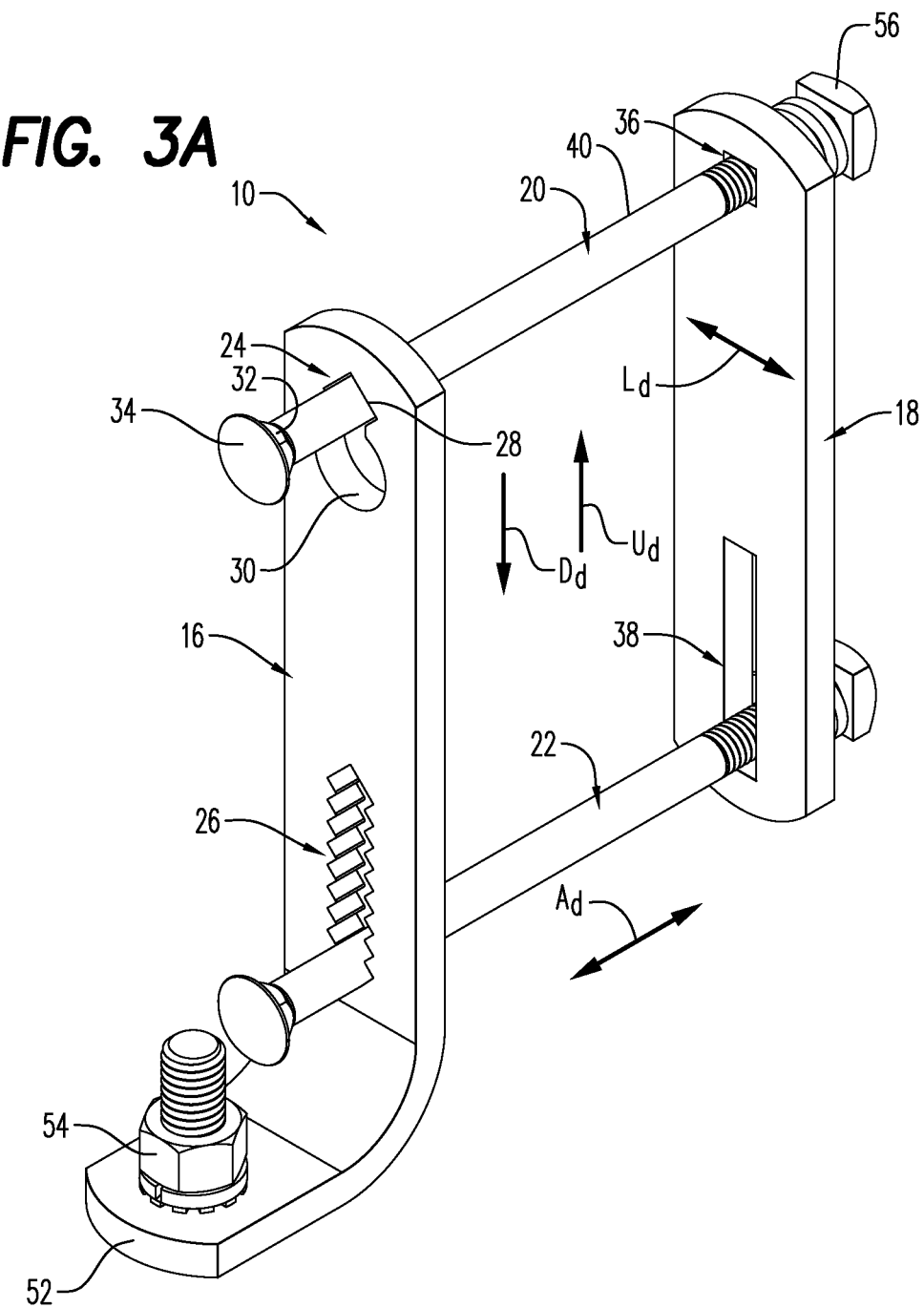
FIG. 3a is a top perspective view of the bracket assembly of FIG. 1 in a partially opened state.

In this manner, bracket assembly 10 can be disassembled by the user who simply moves upper fastener 20 and first strap 16 in the axial direction ($A_d$) with respect to one another in a first direction so that neck 32 is free from cutout 28 as seen in FIG. 3a. Then, the user can move upper fastener 20 in downwards direction ($D_d$) so that shaft 40 passes via passageway 44 from cutout 28 into keyhole 30. With shaft 40 of upper fastener 20 in keyhole 30, upper fastener 20 and first strap 16 can be moved in the axial direction ($A_d$) with respect to one another in an opposite direction so that head 34 passes through keyhole 30 such that bracket assembly 10 is in an open position for placement over support 12 as seen in FIG. 3b. Assembly of bracket assembly 10 can be achieved by reversing the above steps.

It should be recognized that bracket assembly 10 is described above by way of example as requiring movement of upper fastener 20 in both the axial direction ($A_d$) and the downwards direction ($D_d$) in separate steps. Of course, it is contemplated by the present disclosure that an angular displacement of first and second straps 16, 18 with respect to one another can also be used to provide simultaneous displacement in the axial and downwards directions ($A_d$, $D_d$) necessary to remove head 34 through keyhole 30.

Figure 2:
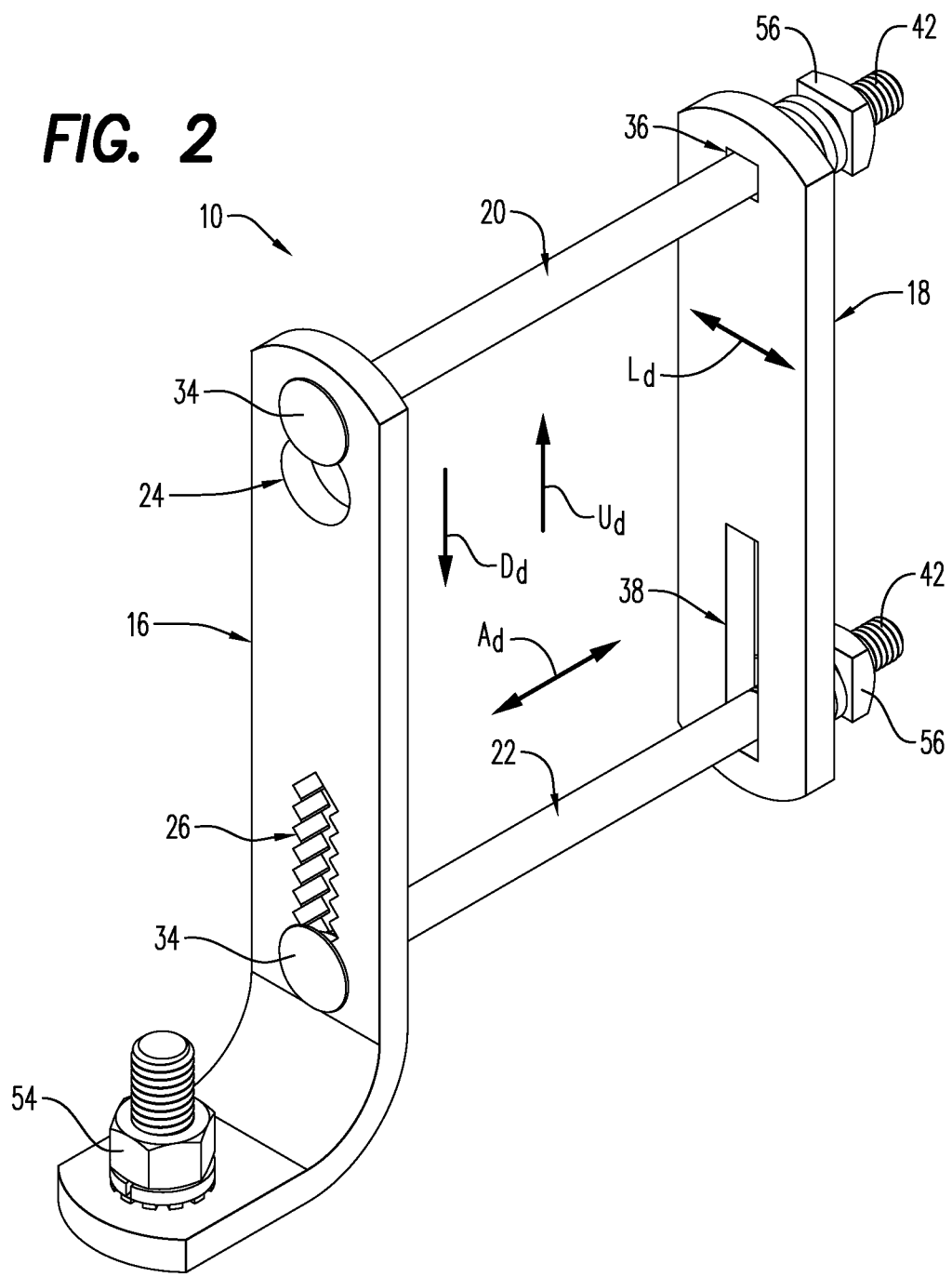
FIG. 2 is a top perspective view of the bracket assembly of FIG. 1 in an assembled state or pre-installation state.

Bracket assembly 10 can be provided to a user in an assembled state, as shown in FIG. 2. Here, strap 16, 18 and upper fastener 20 can be removably staked in a predetermined position with respect to one another to ensure neck 32 of the upper fastener remains within cutout 28. The staking being breakable/removable at the time of installation to allow upper fastener 20 to be moved to the open position of FIG. 2.

The relationship of lower fastener 22 and lower apertures 26, 38 of first and second straps 16, 18, respectively, is now described. Generally, lower fastener 22 and lower apertures 26, 38 are configured to adjust the spacing (S) between the fasteners by moving lower fastener 22 in the upward and downward directions ($U_d$, $D_d$) among a number of discrete positions defined within first strap 16.

Figure 5A:
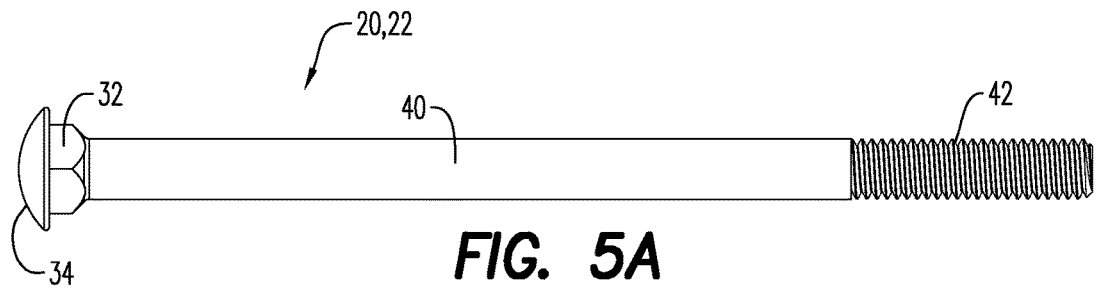
FIG. 5a is a side view of a carriage bolt for use with the bracket assembly of FIG. 1.
Figure 5B:
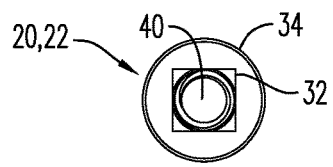
FIG. 5b is an end view of the carriage bolt for use with the bracket assembly of FIG. 1.
Figure 6:
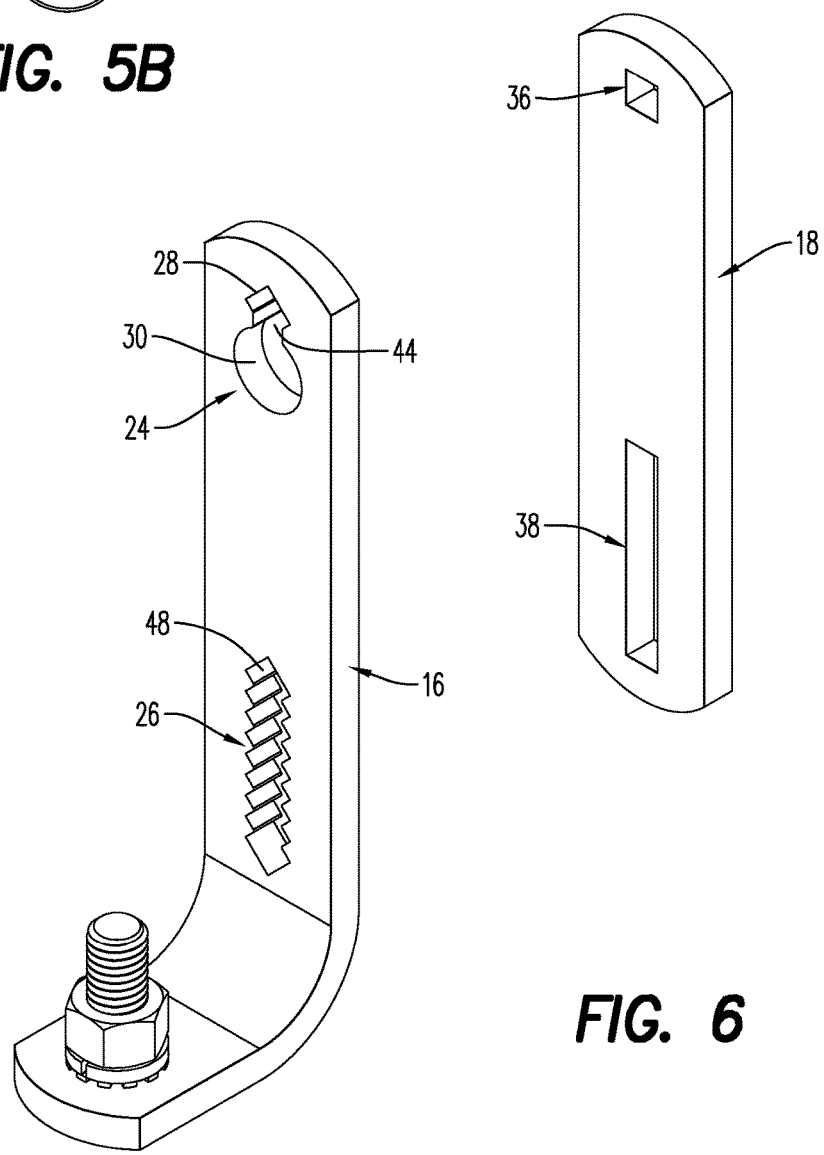
FIG. 6 is a perspective view of the first and second straps from the bracket assembly of FIG. 1 with the fasteners removed for reasons of clarity.
Figure 7:
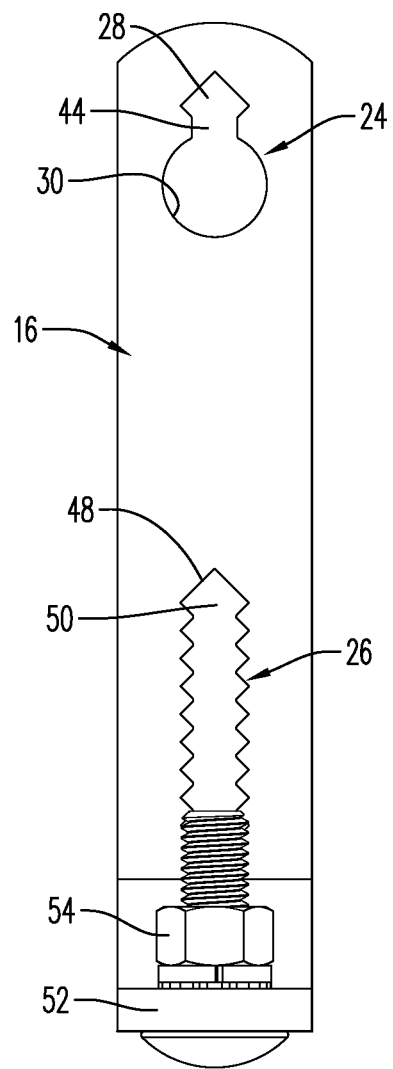
FIG. 7 is a front view of the first strap from the bracket assembly of FIG. 1.
Figure 8:
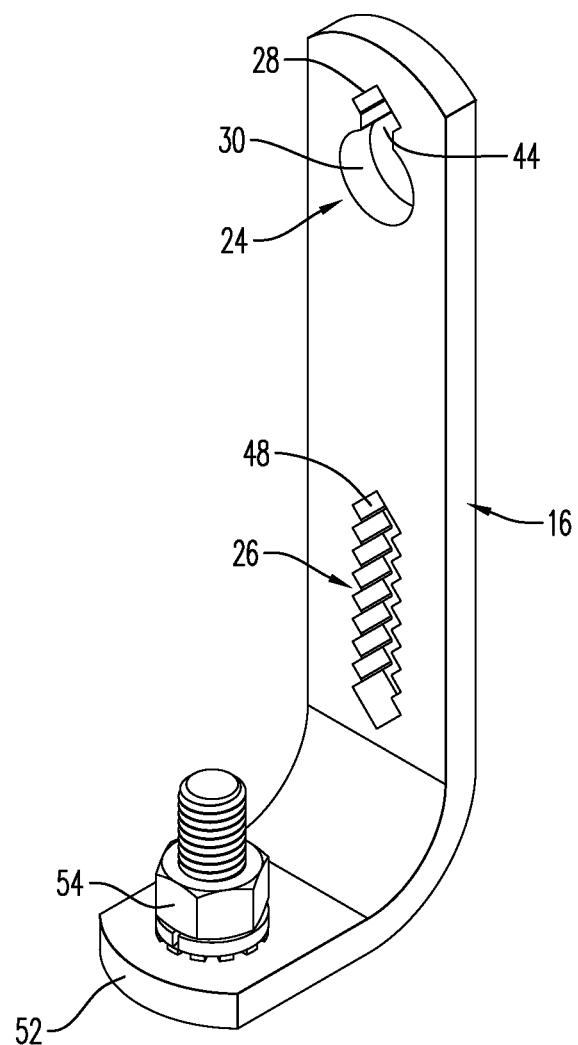
FIG. 8 is a perspective view of the first strap from the bracket assembly of FIG. 1.
Figure 9:
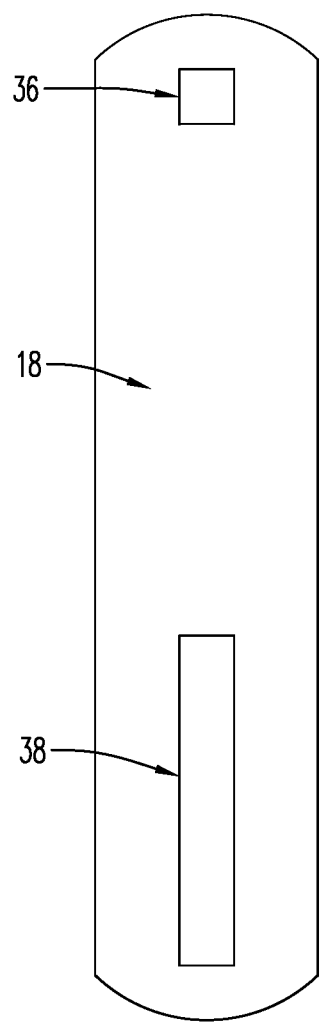
FIG. 9 is a front view of the second strap from the bracket assembly of FIG. 1.
Figure 10:
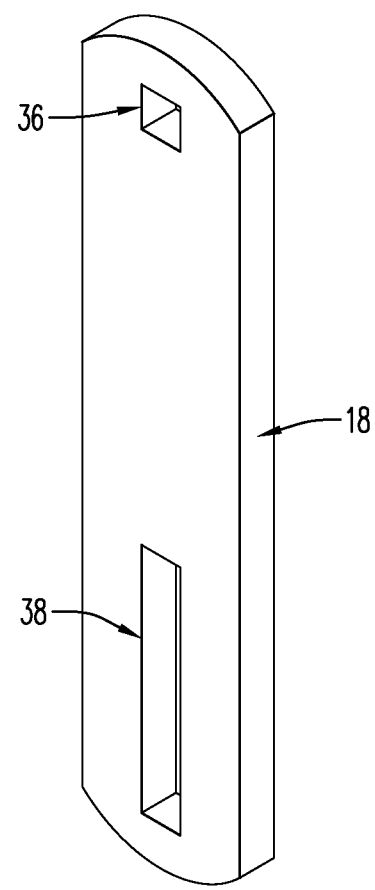
FIG. 10 is a perspective view of the second strap from the bracket assembly of FIG. 1.

Here, lower fastener 22 is also carriage bolt as in FIGS. 5a and 5b, which includes neck 32, head 34, shaft 40, and threaded end 42.

Lower aperture 26 of first strap 16 is an elongated aperture formed by a plurality of nested cutouts 48. Lower aperture 38 of second bracket 18 is also an elongated aperture. The lower apertures 26, 38 are positioned opposite one another so as to allow lower fastener 22 to slide along the extent of the apertures to increase or decrease space (S) between the lower fastener and upper fastener 20.

Each cutout 48, much like cutout 28 discussed above is shaped so that it generally conforms to a profile of neck 32 of lower fastener 22. Each cutout 48 thus secures neck 32 in place, so that lower fastener 22 is maintained in a desired position. Stated another way, each cutout 48 defines a discrete position for lower fastener 22. Cutouts 48 are described as being "nested", meaning that each cutout partially overlaps an adjacent cutout so as to define a region 50 of overlapped cutouts therebetween.

Thus, first strap 16 has region 50 that connects each cutouts 48 to an immediately adjacent cutout. Region 50 is large enough to allow shaft 40 to pass from one cutout 48 to the adjacent cutout, but is small enough to prevent neck 32 to pass from between the cutouts.

In this manner, the user can move lower fastener 22 and first strap 16 in the axial direction ($A_d$) with respect to one another in a first direction so that neck 32 is free from one cutout 48. Then, the user can move lower fastener 22 in the upwards or downwards directions ($D_d$, $U_d$) so that shaft 40 passes from one cutout 48 into an adjacent cutout through region 50.

Similar to upper fastener 20 discussed above, strap 16, 18 and lower fastener 22 can also be removably staked in a predetermined position with respect to one another to ensure neck 32 of the lower fastener remains in a predetermined cutout 48 of lower aperture 26 of first strap 16.

First strap 16 can have an L-shaped portion or lip 52, to which device 12 can be secured by one or more fasteners 54 (only one shown). In some embodiments, fasteners 20, 22 can include, at threaded end 42, a nut 54 and washer 56, where the washer can be a lock washer.

Advantageously and unlike prior art bracket assemblies, first and second straps 16, 18 include opening 24, 26, 36, 38 that are closed in the lateral directions ($L_d$), as well as in the upward and downward directions ($U_d$, $D_d$) to ensure that fasteners 20, 22 do not inadvertently slip out of the opening during installation. In addition, upper aperture 24 on first strap 16 is configured to allow the user to move upper fastener 20 to the open position of FIG. 3b by way of cutout 28 and keyhole 30. Moreover, lower apertures 26, 38 on strap 16, 18, respectively, are configured to allow the user to move lower fastener 22 in the upward and downward directions ($U_d$, $D_d$) to adjust spacing (S) between the lower fastener and upper fastener 20 to adjust bracket assembly 10 to different size supports 12 by way of nested cutouts 48.

Accordingly and as advantageously described herein, movement of bracket assembly 10 among the closed, pre-installation position of FIG. 2, the open position of FIG. 3, and the installed position of FIG. 1 does not require the user to loosen or fasten any bolts with a separate tool. Rather, only the tightening of nut 56 when in the installed position requires the use of a tool.

It should be recognized that the illustrated embodiment is shown having neck 32 of fasteners 20, 22 with a square profile and showing cutouts 28, 48 with a matching square profile. Of course, it is contemplated by the present disclosure for neck 32 and cutouts 28, 48 to have any desired corresponding shapes.

Additionally, it should be recognized that the illustrated embodiment is shown having head 34 of fasteners 20, 22 with a circular profile and showing keyhole 30 with a matching circular profile. Of course, it is also contemplated by the present disclosure for head 34 and keyhole 30 to have any desired corresponding shapes.

As disclosed with respect to the embodiments of FIGS. 1-10, upper aperture 24 is an openable aperture, meaning that the upper aperture allows head 34 of upper fastener 20 to be removed from assembly 10, while lower aperture 26 is an adjustable aperture, meaning that the lower aperture maintains lower fastener 22 in the assembly 10 but allows the lower fastener to be moved to adjust the spacing (S) between the fasteners.

Figure 11:
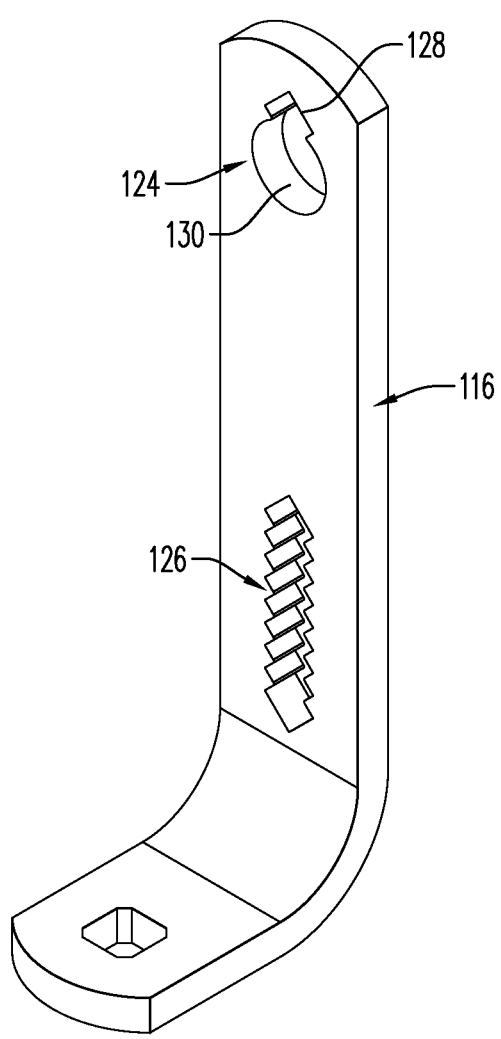
FIG. 11 is a perspective view of an alternate exemplary embodiment of a first strap for use with the bracket assembly of FIG. 1.
Figure 12:
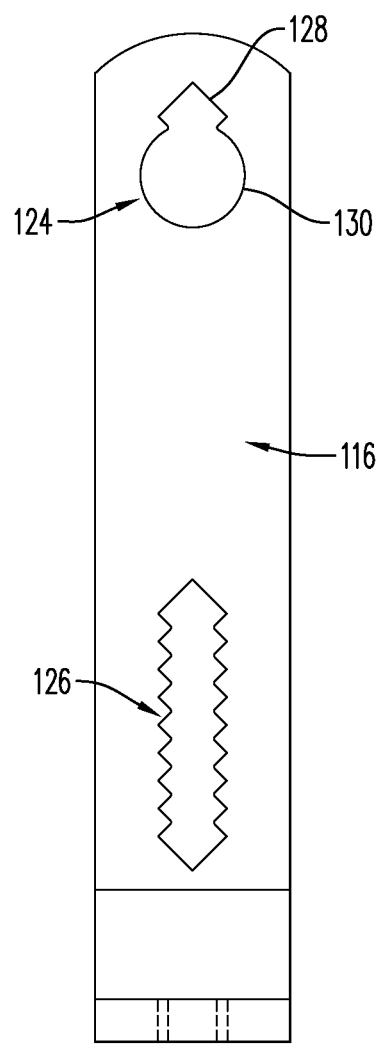
FIG. 12 is front view of the first strap of FIG. 11.

Referring now to FIGS. 11 and 12, an alternate exemplary embodiment of the first strap for use with assembly 10 is shown and is generally referred to by reference numeral 116. Here, component parts performing similar and/or analogous functions to those discussed above are numbered in multiples of one hundred. Unless otherwise discussed, first strap 116 is configured for use with the components of assembly 10.

First strap 116 has an upper aperture 124 and a lower aperture 126. For reasons of clarity, aperture 124 is referred to as the openable aperture and aperture 126 is referred to as the adjustable aperture.

Openable aperture 124 includes a bolt neck cutout 128 adjacent to a keyhole 130. Cutout 128 can be shaped so that it generally conforms to a profile of a neck of the upper fastener. Cutout 128 can thus secure the neck in place, so that the upper fastener does not slip or fall downward when the lineman is installing bracket assembly 10. Keyhole 130 has a shape generally conforming to that of a head of the upper fastener, but is large enough for the head to pass therethrough.

In this embodiment, openable aperture 124 lacks the passageway 44 discussed above with respect to first strap 16. Instead of passageway 44 that connects cutout 28 and keyhole 30, openable aperture 124 has cutout 128 positioned so as to overlap keyhole 130 in a manner that allows the shaft of the upper fastener to pass from cutout 128 to keyhole 130, but is small enough to prevent the neck of the upper fastener to pass from the cutout to the keyhole.

Figure 13:
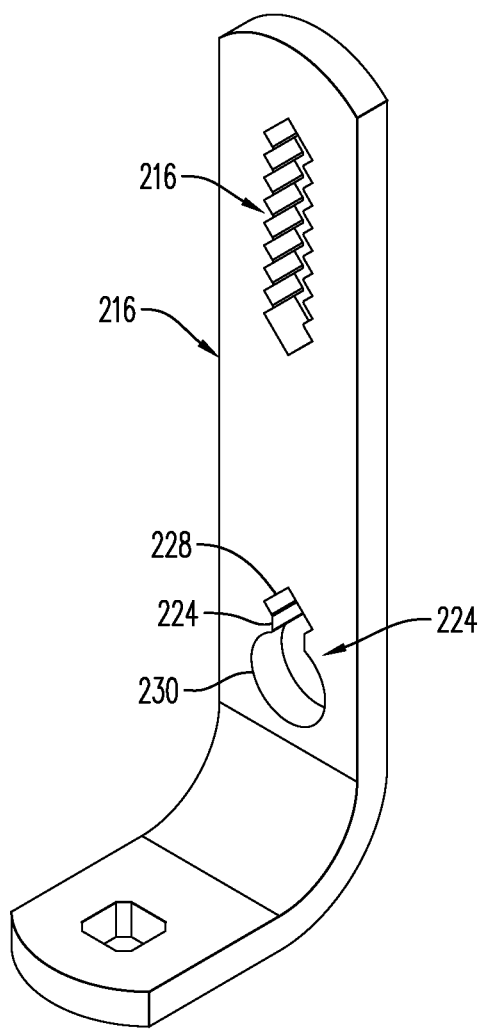
FIG. 13 is a perspective view of another alternate exemplary embodiment of a first strap for use with a bracket assembly according to the present disclosure.
Figure 14:
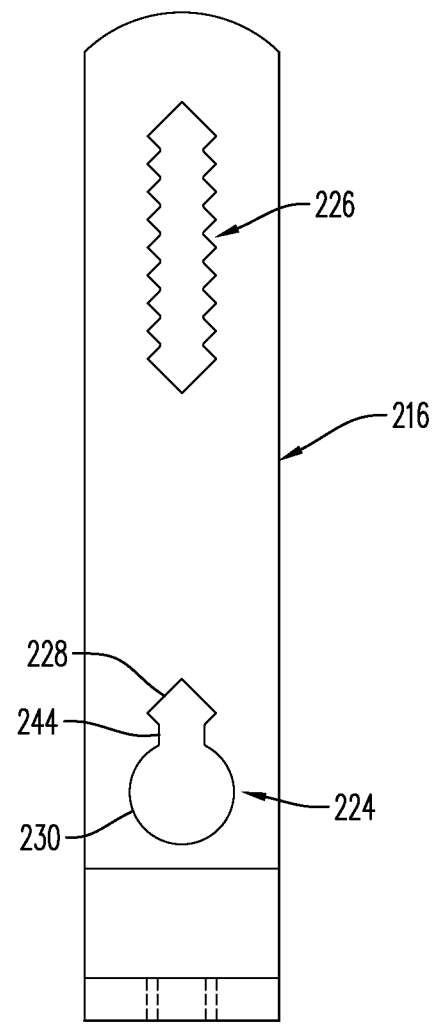
FIG. 14 is front view of the first strap of FIG. 13.

Referring now to FIGS. 13 and 14, an alternate exemplary embodiment of the first strap for use with assembly 10 is shown and is generally referred to by reference numeral 216. Here, component parts performing similar and/or analogous functions to those discussed above are numbered in multiples of two hundred. Unless otherwise discussed, first strap 216 is configured for use with the components of assembly 10.

First strap 216 has a lower aperture 224 and an upper aperture 226. For reasons of clarity, aperture 224 is referred to as the openable aperture and aperture 226 is referred to as the adjustable aperture.

Figure 15:
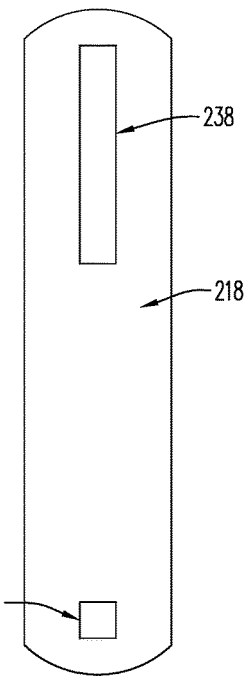
FIG. 15 is front view of a second strap for use with the first strap of FIG. 13.

Here, it can be seen that the position of apertures 224, 226 on first strap 216 have been switched as compared to the positions of apertures 24, 26 of first strap 16. Stated another way, the openable aperture 24 of first strap 16 is positioned at the upper region of strap 16, whereas the openable aperture 224 of first strap 216 is positioned at the lower region of strap 216. It should be appreciated that first strap 216 requires the position of apertures 236, 238 of second strap 218 to also be switched as shown in FIG. 15.

It should be recognized that the embodiment of FIGS. 13 and 14 is illustrated by way of example only having openable aperture 224 with bolt neck cutout 228 operatively connected to keyhole 230 by passageway 244. Of course, it is contemplated by the present disclosure for first strap 216 to lack passageway 244 in the manner disclosed with respect to FIGS. 11 and 12.

Figure 16:
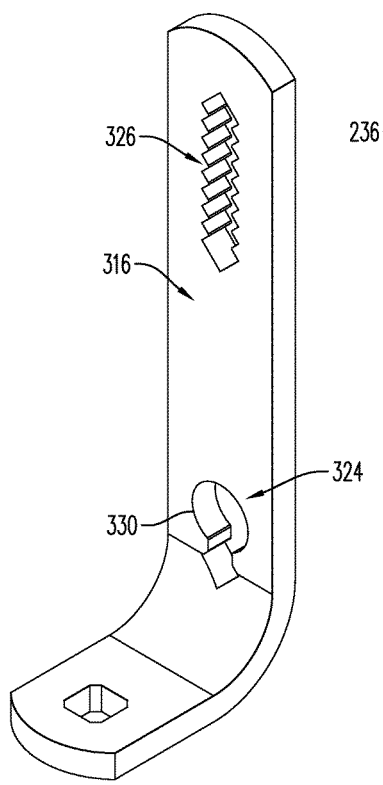
FIG. 16 is a perspective view of still another alternate exemplary embodiment of a first strap for use with a bracket assembly according to the present disclosure.
Figure 17:
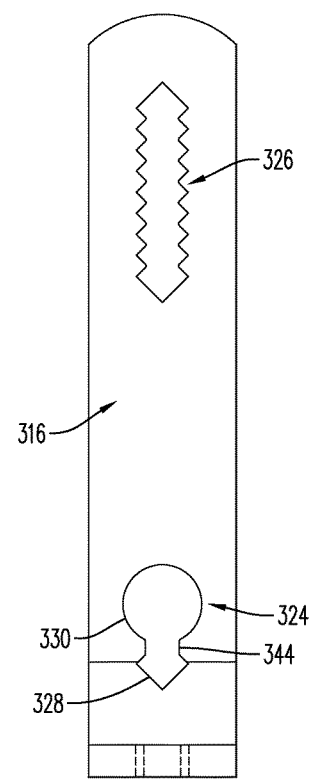
FIG. 17 is front view of the first strap of FIG. 16.

Referring now to FIGS. 16 and 17, an alternate exemplary embodiment of the first strap for use with assembly 10 is shown and is generally referred to by reference numeral 316. Here, component parts performing similar and/or analogous functions to those discussed above are numbered in multiples of two hundred. Unless otherwise discussed, first strap 316 is configured for use with the components of assembly 10.

First strap 316 has a lower aperture 324 and an upper aperture 326. For reasons of clarity, aperture 324 is referred to as the openable aperture and aperture 326 is referred to as the adjustable aperture. Again, it can be seen that the position of apertures 324, 326 on first strap 316 have been switched as compared to the positions of apertures 24, 26 of first strap 16. While not illustrated, it should be appreciated that first strap 316 requires the apertures of the second strap to also be switched as illustrated in FIG. 15.

Openable aperture 324 includes a bolt neck cutout 328 operatively connected to a keyhole 330 by a passageway 344. In this embodiment, the position of cutout 328 and keyhole 330 on first strap 316 have been switched as compared to the positions of cutout 28 and keyhole 30 of first strap 16.

It should be recognized that the embodiment of FIGS. 16 and 17 is illustrated by way of example only having openable aperture 324 with cutout 328 operatively connected to keyhole 330 by passageway 344. Of course, it is contemplated by the present disclosure for first strap 316 to lack passageway 344 in the manner disclosed with respect to FIGS. 11 and 12.

The terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST bracket assembly 10
electrical device 12
support 14
first strap 16, 116, 216, 326
second strap 18, 218
upper or first fastener 20
lower or second fastener 22
upper or openable aperture 24, 124, 224, 324 of first strap
lower or adjustable aperture 26, 124, 224, 324 of first strap
cutout 28, 128, 228, 328
keyhole 30, 130, 230, 330
neck 32
head 34
upper aperture 36, 236 of second strap
lower aperture 38, 238 of second strap
shaft 40
threaded end 42
passageway 44, 244, 344
nested cutouts 48
region 50
lip 52
fastener 54
nut 56
washer 58
upward and downward directions ($U_d$, $D_d$)

axial directions ($A_d$)
lateral directions ($L_d$)
spacing (S) between fasteners 20, 22

What is claimed is:

1. A bracket assembly comprising:
a first strap including an openable aperture and an adjustable aperture, the openable aperture having a cutout operatively connected to a keyhole, the adjustable aperture having a plurality of plurality of nested cutouts;
a second strap with a first aperture positioned opposite the openable aperture and a second aperture positioned opposite the adjustable aperture, the second aperture being an elongated rectangle;
a first fastener having a head, a neck, and a shaft, the neck of the first fastener having a profile corresponding to the cutout, the first fastener passing between the first and second straps through the openable aperture and the first aperture; and
a second fastener having a head, a neck, and a shaft, the neck of the second fastener having a profile corresponding to the plurality of nested cutouts, the second fastener passing between the first and second straps through the adjustable aperture and the second aperture.

2. The bracket assembly of claim 1, wherein the keyhole and cutout are configured to allow the shaft of the first fastener to pass vertically therebetween, but being configured to prevent the neck of the first fastener from vertically passing therebetween.

3. The bracket assembly of claim 2, wherein the keyhole, cutout, and head are configured to allow the head to pass axially through the keyhole, but prevent the head from passing axially through the cutout.

4. The bracket assembly of claim 2, further comprising a passageway between the cutout and neck, the passageway being configured to allow the shaft of the first fastener to pass vertically through the passageway between the cutout and the keyhole.

5. The bracket assembly of claim 1, wherein the cutout is above or below the keyhole.

* * * * *